US008452085B2

(12) United States Patent
Itoh

(10) Patent No.: US 8,452,085 B2
(45) Date of Patent: May 28, 2013

(54) IMAGE PROCESSING APPARATUS, IMAGE PROCESSING METHOD AND COMPUTER READABLE MEDIUM FOR COLOR EXTRACTION AND DELETION

(75) Inventor: Atsushi Itoh, Kanagawa (JP)

(73) Assignee: Fuji Xerox Co., Ltd., Tokyo (JP)

(*) Notice: Subject to any disclaimer, the term of this patent is extended or adjusted under 35 U.S.C. 154(b) by 796 days.

(21) Appl. No.: 12/548,048

(22) Filed: Aug. 26, 2009

(65) Prior Publication Data

US 2010/0239161 A1 Sep. 23, 2010

(30) Foreign Application Priority Data

Mar. 18, 2009 (JP) ................................ 2009-067017

(51) Int. Cl.
*G06K 9/00* (2006.01)
(52) U.S. Cl.
USPC .......................................... 382/163; 382/167
(58) Field of Classification Search
USPC ............. 348/234; 358/1.9, 1.8, 518; 382/162, 382/166, 266; 715/764
See application file for complete search history.

(56) References Cited

U.S. PATENT DOCUMENTS

| 5,742,520 | A | * | 4/1998 | Uchikawa et al. | 358/518 |
|---|---|---|---|---|---|
| 6,518,981 | B2 | * | 2/2003 | Zhao et al. | 715/764 |
| 7,139,096 | B2 | * | 11/2006 | Ishikawa | 358/1.8 |
| 7,158,669 | B2 | * | 1/2007 | Tanaka et al. | 382/166 |
| 7,925,082 | B2 | * | 4/2011 | Itoh | 382/162 |
| 2004/0160519 | A1 | * | 8/2004 | Horita | 348/234 |
| 2007/0139667 | A1 | * | 6/2007 | Russell et al. | 358/1.9 |
| 2008/0069442 | A1 | | 3/2008 | Itoh | |
| 2008/0292204 | A1 | * | 11/2008 | Itoh | 382/266 |
| 2009/0041343 | A1 | * | 2/2009 | Itoh | 382/162 |

FOREIGN PATENT DOCUMENTS

| JP | A-5-159050 | 6/1993 |
|---|---|---|
| JP | A-9-127924 | 5/1997 |
| JP | A-2005-4470 | 1/2005 |
| JP | A-2008-65803 | 3/2008 |

OTHER PUBLICATIONS

Japanese Office Action dated Nov. 25, 2010 issued in Japanese Patent Application No. 2009-067017 (with translation).

* cited by examiner

*Primary Examiner* — Vu Le
*Assistant Examiner* — Xuemei Chen
(74) *Attorney, Agent, or Firm* — Oliff & Berridge, PLC

(57) ABSTRACT

An image processing apparatus is provided, the apparatus including: a color extracting section that extracts colors contained in processing image data as a flat color or a characteristic color; a first evaluation value calculating section that calculates a flat color evaluation value with respect to a combination of flat colors based on a color difference, and that calculates a characteristic color evaluation value with respect to a combination of characteristic colors based on a color difference; a second evaluation value calculating section that calculates a combination evaluation value with respect to a combination of a characteristic color and a flat color based on a color difference; and a deleting section that reduces a number of colors to a preset number by deleting a color extracted by the color extracting section in accordance with the characteristic color evaluation value, flat color evaluation value and the combination evaluation value.

17 Claims, 7 Drawing Sheets

IMAGE PROCESSING APPARATUS, IMAGE PROCESSING METHOD AND COMPUTER READABLE MEDIUM FOR COLOR EXTRACTION AND DELETION

CROSS-REFERENCE TO RELATED APPLICATIONS

This application is based on and claims priority under 35 U.S.C. 119 from Japanese Patent Application No. 2009-067017 filed Mar. 18, 2009.

BACKGROUND

1. Technical Field

The present invention relates to an image processing apparatus, an image processing method and a computer readable medium.

2. Related Art

Conventionally, there has been carried out a color limitation processing for reducing the number of colors used in an image. By the color limitation processing, there are reduced various noises or irregularities contained in an image, for example, a printing irregularity of a document or a scan noise made in a reading operation in the case in which a document image is read by an image reader and a handwriting irregularity in the case in which a handwritten part is present. In the case in which an image is compressed, moreover, a compression noise is reduced and a compressibility is enhanced.

In the color limitation processing, a color is to be extracted in such a manner that the number of color specifications does not exceed a preset number in some cases.

SUMMARY

According to an aspect of the present invention, there is provided an image processing apparatus including:

a color extracting section that extracts colors contained in processing image data, each of the colors being extracted as a flat color or a characteristic color where the flat color represents a color used in a large number of pixels in the processing image data and the characteristic color represents a color characteristic in the processing image data;

a first evaluation value calculating section that calculates a flat color evaluation value with respect to a combination of colors extracted as the flat color based on a color difference therebetween, and that calculates a characteristic color evaluation value with respect to a combination of colors extracted as the characteristic color based on a color difference therebetween;

a second evaluation value calculating section that calculates a combination evaluation value with respect to a combination of a color extracted as the characteristic color and a color extracted as the flat color based on a color difference therebetween; and a deleting section that reduces a number of colors to a preset number by deleting a color extracted by the color extracting section in accordance with the characteristic color evaluation value, flat color evaluation value and the combination evaluation value.

BRIEF DESCRIPTION OF THE DRAWINGS

Exemplary embodiments of the present invention will be described in detail based on the following figures, wherein.

DETAILED DESCRIPTION

Figure 1:
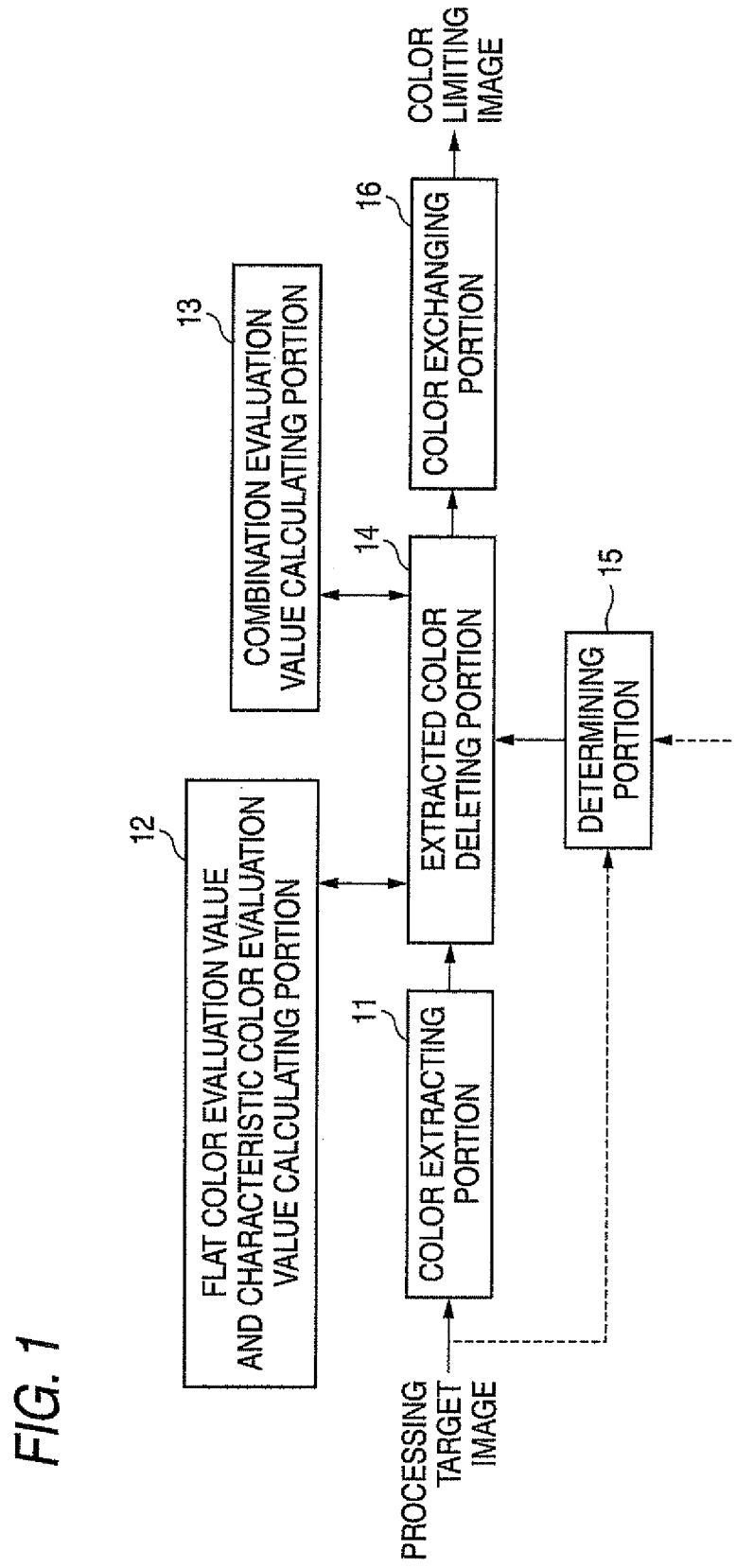
FIG. 1 is a diagram showing a structure according to a first exemplary embodiment of the invention.

FIG. 1 is a diagram showing a structure according to a first exemplary embodiment of the invention. In FIG. 1, 11 denotes a color extracting portion, 12 denotes a flat color evaluation value and characteristic color evaluation value calculating portion (first evaluation value calculating section), 13 denotes a combination evaluation value calculating portion (second evaluation value calculating section), 14 denotes an extracted color deleting portion, 15 denotes a determining portion, and 16 denotes a color exchanging portion. Any color image may be used for a processing target image to be a target of a color limitation processing.

The color extracting portion 11 extracts at least one flat color and at least one characteristic color from colors used in a processing target image. The flat color is used in a region constituted by a large number of pixels, for example, a simple color in the processing target image. Moreover, the characteristic color is characteristic in the processing target image, for example, a color in which a large number of pixels are not always used in the processing target image and which is greatly different from colors in other portions as in the case in which a remarkable color is partially used.

For a method of extracting the flat color and the characteristic color, it is preferable to use a well-known method. For example, it is preferable to generate a frequency distribution of a color used in a processing target image and to select the flat color and the characteristic color from colors having a maximum frequency. For the flat color, it is preferable to extract a maximum color having a high frequency in the color frequency distribution. For example, it is preferable to extract a maximum color having a preset frequency value or less or to extract a preset number of maximum colors in descending order of the frequency value. For the characteristic color, moreover, it is preferable to extract a maximum color in which a distance from the other maximum colors is great. For example, it is preferable to extract a maximum color in which a distance in a color space to the other maximum colors is greater than a preset distance. For another method, it is preferable to extract a convex portion taking a frequency distribution shape in the color space, that is, a color having a higher frequency than a frequency of a surrounding color. For example, any of surrounding maximum colors having a lower frequency than a preset frequency value is counted. In the case in which the count value is greater than a preset count value, it is preferable to extract the maximum color as a characteristic color. For a further method, it is preferable to refer to pixels around a position in which the maximum color is used in a processing target image and to extract, as a characteristic color, a maximum color having a greater chrominance from surrounding pixels than a preset chrominance. For example, it is preferable to calculate a secondary differential value of the processing target image and to extract, as a characteristic color, a maximum color having a greater secondary differential value than a preset secondary differential value. In any case, it is preferable to carry out a clustering processing for a frequency distribution of a color which is generated.

In some cases, similar colors are extracted as the flat and characteristic colors. For example, in the case in which the characteristic color and the flat color are present within a preset color range, it is preferable to delete either the characteristic color or the flat color. It is preferable to delete either of them in accordance with a predetermined method. For example, it is also possible to use a method of deleting a predetermined one of them or a method of deleting either of them based on an evaluation value obtained in accordance with a preset evaluation function. In the case in which either of them is deleted in accordance with the preset evaluation function, it is preferable to calculate an evaluation value Kij as follows, for example.

$$Kij = w1 \cdot Fi - w2 \cdot Fj$$

Fi represents a frequency of the characteristic color and Fj represents a frequency of the flat color. w1 and w2 represent a weight. It is preferable to delete the flat color if the evaluation value Kij is positive and to delete the characteristic color if the evaluation value Kij is negative. As a matter of course, the evaluation function is not restricted to the example. Here, "a characteristic color and a flat color are present within a preset color range" means a case where an extracted characteristic color and an extracted flat color exist within a preset range on color space.

The flat color evaluation value and characteristic color evaluation value calculating portion 12 calculates an evaluation value based on at least a color difference for a combination of the characteristic colors and that of the flat colors which are extracted by the color extracting portion 11 as a flat color evaluation value and a characteristic color evaluation value. The flat color evaluation value and the characteristic color evaluation value are calculated by using evaluation value Hij. As an example, it is assumed that a chrominance is used as the color difference and a frequency is used together. In the case in which two of the flat colors or the characteristic colors which are extracted are represented by Ci and Cj and respective frequency values are represented by Fi and Fj, it is preferable to calculate an evaluation value Hij in accordance with the following equation.

$$Hij = |Ci - Cj| + (Fi - Fj)$$

|Ci−Cj| represents a distance (a chrominance) in a color space between the colors Ci and Cj. The evaluation value Hij is obtained for a combination of the respective flat colors and that of the respective characteristic colors. For example, in the case in which the evaluation value Hij (j=1, . . . , i−1, i+1, . . . , n) is obtained for a certain color Ci, it is preferable to set a minimum value as a flat color evaluation value and a characteristic color evaluation value Hi of the color Ci. The flat color evaluation value and the characteristic color evaluation value Hi thus obtained are great if a chrominance from the other colors is great in the flat or characteristic colors and a frequency is higher than the other colors.

As a matter of course, the evaluation value Hij may be obtained by other methods in addition to the method. For example, it is also possible to calculate a difference for the color difference through a division into a hue, a brightness and a saturation, and furthermore, to obtain a peak degree of a maximum value from a frequency distribution together with a frequency, and to thus calculate the evaluation value Hij in accordance with the following equation:

$$Hij = w1 \cdot d(\text{hue}) + w2 \cdot d(\text{brightness}) + w3 \cdot d(\text{saturation}) + w4 \cdot d(\text{frequency}) + w5 \cdot d(\text{peak degree}) + w6$$

wherein w1, w2, w3, w4 and w5 represent a weight and w6 represents a constant. Moreover, d( ) represents a difference in a quantity indicated in parentheses between two colors. It is not necessary to always use the hue, the brightness and the saturation as in the example and a method of using the hue is also employed, for instance. In addition, it is also possible to carry out an evaluation by taking various elements into account.

The combination evaluation value calculating portion 13 calculates an evaluation value based on at least a color difference for the combination of the characteristic and flat colors extracted by the color extracting portion 11 as a combination evaluation value. The combination evaluation value is calculated by using evaluation value Gij. As an example, a chrominance is used as the color difference. In the case in which a combination of one of the flat colors and one of the characteristic colors which are extracted is represented by Ci and Cj, it is preferable to calculate an evaluation value Gij in accordance with the following equation.

$$Gij = |Ci - Cj|$$

|Ci−Cj| represents a distance (a chrominance) in a color space of the colors Ci and Cj. The evaluation value Gij is calculated for each of the combinations of the flat and characteristic colors. For example, in the case in which the evaluation value Gij (j=1, . . . , i−1, i+1, . . . , n) is obtained for a certain color Ci, it is preferable to set a minimum value thereof as a combination evaluation value Gi of the color Ci. The combination evaluation value Gi thus obtained is great if a chrominance is larger than all of the characteristic colors in case of the flat color and all of the flat colors in case of the characteristic color. The characteristic color originally has a smaller frequency value than the flat color. Therefore, the frequency value is not used in the calculation of the combination evaluation value.

As a matter of course, the evaluation value Gij may be obtained by other methods in addition to the method. For example, it is also possible to obtain a difference as a color difference through a division into a hue, a brightness and a saturation and to calculate the evaluation value Gij in accordance with the following equation:

$$Gij = W1 \cdot d(\text{hue}) + W2 \cdot d(\text{brightness}) + W3 \cdot d(\text{saturation}) + W4$$

wherein W1, W2 and W3 represent a weight and W4 represents a constant. Moreover, d( ) represents a difference in a quantity indicated in parentheses between two colors. It is not necessary to always use the hue, the brightness and the saturation as in the example and a method of using the hue is also employed, for instance. In addition, it is also possible to carry out an evaluation by taking various elements into account.

The extracted color deleting portion 14 deletes the number of colors which exceeds a preset number in the colors extracted by the color extracting portion 11 based on the flat color evaluation value and the characteristic color evaluation value calculated by the flat color evaluation value and characteristic color evaluation value calculating portion 12 and the combination evaluation value calculated by the combination evaluation value calculating portion 13. In the deletion, there are employed some processing methods of attaching importance to a flat color to be left, attaching importance to a characteristic color to be left and making a general decision. Any of the processing methods is employed. In addition, any of the processing methods is selected by the determining portion 15 in the example. A specific deletion processing will be described below.

The determining portion 15 determines either the characteristic color or the flat color to be left with a priority or makes a general decision for a deletion. The determination is preferably carried out for presetting performed by a user. Alternatively, the determination may be carried out in accordance with a result of an analysis of a processing target image. In this case, for example, it is also possible to carry out a local floating binary processing over the processing target image, thereby extracting a character region and making a determination based on a result obtained by counting pixels in a character portion, to extract a non-ground region through an in-plane floating binary processing over the processing target image, thereby making a determination based on a result obtained by counting the number of pixels in the non-ground region or to make a determination based on a relationship between the result obtained by counting the pixels in the character portion and the result obtained by counting the number of the pixels in the non-ground region. As a matter of course, it is also possible to make a determination by other methods. In the case in which a certain method is fixed to carry out the deletion processing, it is also possible to employ a structure in which the determining portion 15 is not provided.

The color exchanging portion 16 exchanges a color of the processing target image into a preset number of colors or less which are left, and generates an image subjected to a color limitation processing. It is also possible to employ a structure in which the color exchanging portion 16 is not provided and the preset number of colors or less which are obtained by the processing before the extracted color deleting portion 14 are output.

Figure 2:
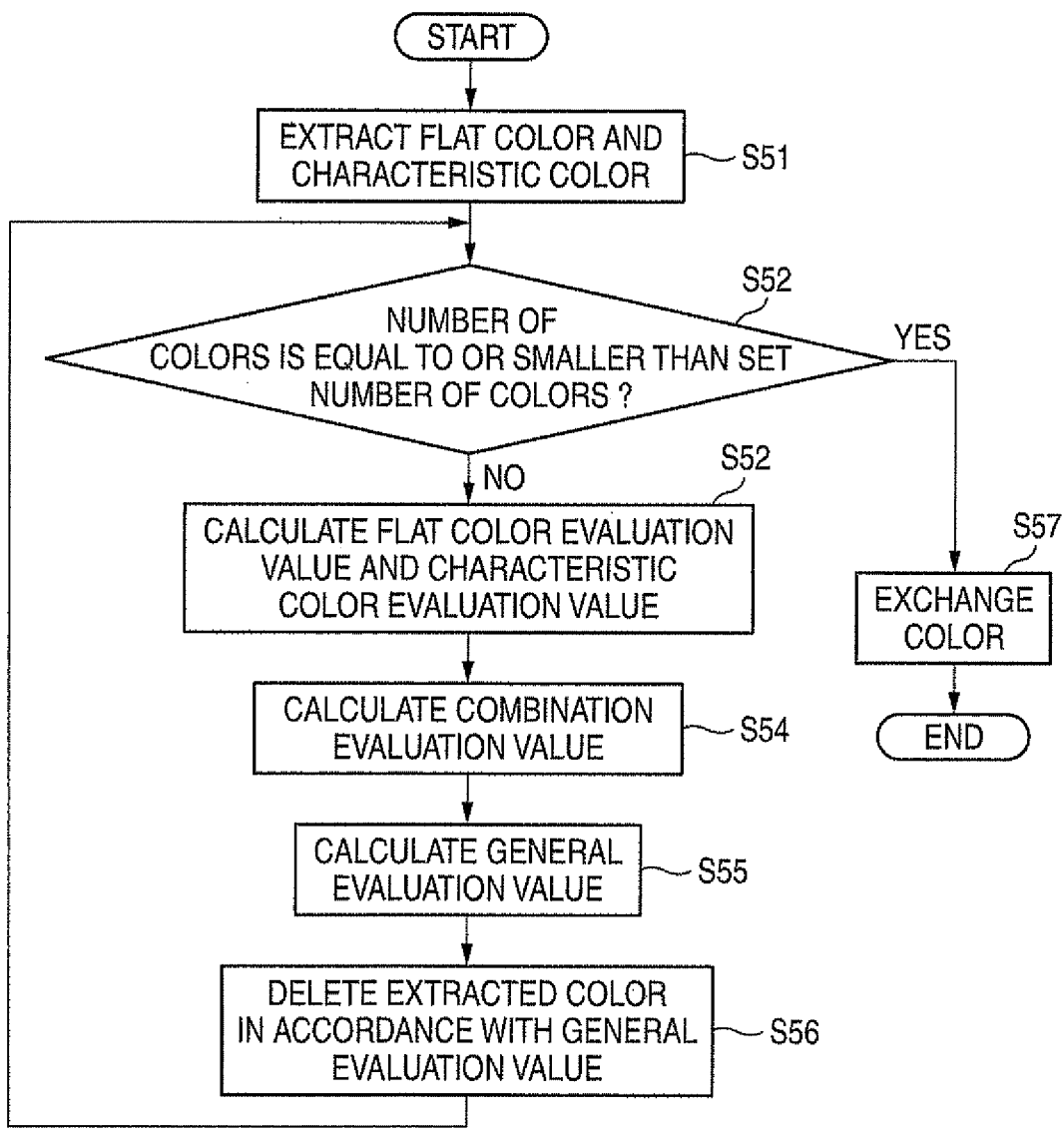
FIG. 2 is a flowchart showing a first operation example according to the first exemplary embodiment of the invention.

Some operation examples according to the first exemplary embodiment of the invention will be described below. FIG. 2 is a flowchart showing a first operation example according to the first exemplary embodiment of the invention. FIG. 2 shows a method of making an evaluation again every deletion of a single color. At S51, the color extracting portion 11 extracts at least one flat color and at least one characteristic color from colors used in a processing target image. In the first exemplary embodiment, a similar color is deleted in the extraction.

At S52, it is decided whether or not the number of the extracted colors is equal to or smaller than a preset number. If the number of the extracted colors exceeds the preset number, the number of colors which exceeds the preset number in the extracted colors are deleted by the extracted color deleting portion 14.

At S53, the extracted color deleting portion 14 causes the flat color evaluation value and characteristic color evaluation value calculating portion 12 to calculate the flat color evaluation value and the characteristic color evaluation value Hi for the characteristic color and the flat color. Moreover, the extracted color deleting portion 14 causes the combination evaluation value calculating portion 13 to calculate the combination evaluation value Gi for the characteristic color and the flat color at S54. The flat color evaluation value Hi, the characteristic color evaluation value Hi and the combination evaluation value Gi may be calculated at the same time or in order, respectively.

At S55, furthermore, the extracted color deleting portion 14 calculates a general evaluation value based on the flat color evaluation value and the characteristic color evaluation value Hi obtained at the S53 and the combination evaluation value Gi obtained at the S54. It is preferable to calculate a general evaluation value Si in accordance with the following equation, for example.

$$Si = \alpha \cdot Hi + \beta \cdot Gi$$

$\alpha$ and $\beta$ represent a weight and are preferably preset. For example, it is also possible to make a general evaluation by attaching importance to the flat color evaluation value and the characteristic color evaluation value Hi with $\alpha > \beta$ or attaching importance to the combination evaluation value Gi with $\alpha < \beta$. If $\alpha = \beta = 1$ is set, a linear sum is obtained and the flat color evaluation value Hi, the characteristic color evaluation value Hi and the combination evaluation value Gi are treated equally.

At S56, one of the extracted flat or characteristic colors is deleted based on the general evaluation value Si obtained at the S55. For example, any of the extracted colors which has the smallest general evaluation value Si is deleted. In the case in which there is any of the colors extracted by the color extracting portion 11 which has a small chrominance, the flat color evaluation value Hi, the characteristic color evaluation value Hi or the combination evaluation value Gi has a small value. Therefore, the evaluation value Si is small. Accordingly, it is decided that a color having a small general evaluation value Si may be replaced with another color. For this reason, a color having the smallest general evaluation value Si is intended for a deletion. In the example, a color to be deleted may be the flat or characteristic color.

The processing returns to the S52 in which it is decided whether the preset number is reached or not. If the preset number is exceeded, the processings from the S52 to the S56 are repeated. In the repetition, it is supposed that the flat color evaluation value Hi, the characteristic color evaluation value Hi and the combination evaluation value Gi are changed because the single color is deleted at the S56. Therefore, the flat color evaluation value Hi, the characteristic color evaluation value Hi and the combination evaluation value Gi are calculated again.

If it is confirmed that the color extracted at the S52 is equal to or smaller than the preset number, the processing proceeds to S57 in which the color exchanging portion 16 exchanges the color of the processing target image into the preset number of colors or less which are left and an image subjected to a color limitation processing is generated. In the case in which there is carried out a processing for extracting the color used in the processing target image within the preset number, the processing of the S57 does not need to be executed.

As a variant of the first operation example, it is also possible to carry out a processing in order to delete the flat color with a priority or to delete the characteristic color with a priority when deleting the colors extracted at the S55 and the S56. Description will be given to an example of the case in which the flat color is deleted with a priority. First of all, it is decided whether a flat color having Hi≦Th in the flat color evaluation value Hi for the flat color is present or not. Th represents a preset threshold. If the flat color having Hi≦Th is present or the characteristic color is not present, the general evaluation value Si is calculated for the flat color and the flat color having the smallest general evaluation value Si which is obtained is deleted. Consequently, the flat color having the flat color evaluation value Hi which is equal to or smaller than the preset threshold is deleted with a priority.

If the flat color having Hi≦Th is not present or the flat color is not present in the first place, moreover, the general evaluation value Si for the characteristic color is calculated and the characteristic color having the smallest general evaluation value Si obtained is deleted. In the case in which the preset number is exceeded even if there is deleted the flat color having the flat color evaluation value Hi which is equal to or smaller than the preset threshold, consequently, the characteristic color is deleted. As a matter of course, the threshold may be further set to the characteristic color to prevent an excessive deletion.

Description will be given to an example of the case in which the characteristic color is deleted with a priority. First of all, it is decided whether the characteristic color having Hi≦Tg in the characteristic color evaluation value Hi for the characteristic color is present or not. Tg represents a preset threshold. If the characteristic color having Hi≦Tg is present or the flat color is not present, the general evaluation value Si is calculated for the characteristic color and the characteristic color having the smallest generation evaluation value Si obtained is deleted. Consequently, the characteristic color having the characteristic color evaluation value Hi which is equal to or smaller than the preset threshold is deleted with a priority.

If the characteristic color having Hi≦Tg is not present or the characteristic color is not present in the first place, moreover, the general evaluation value Si for the flat color is calculated and the flat color having the smallest general evaluation value Si obtained is deleted. In the case in which the preset number is exceeded even if there is deleted the characteristic color having the characteristic color evaluation value Hi which is equal to or smaller than the preset threshold, consequently, the flat color is deleted. As a matter of course, the threshold may be further set to the flat color to prevent an excessive deletion.

Whether the flat color or the characteristic color is to be deleted with a priority or is to be deleted generally is preferably decided in accordance with a result of the determination made by the determining portion 15.

Figure 3:
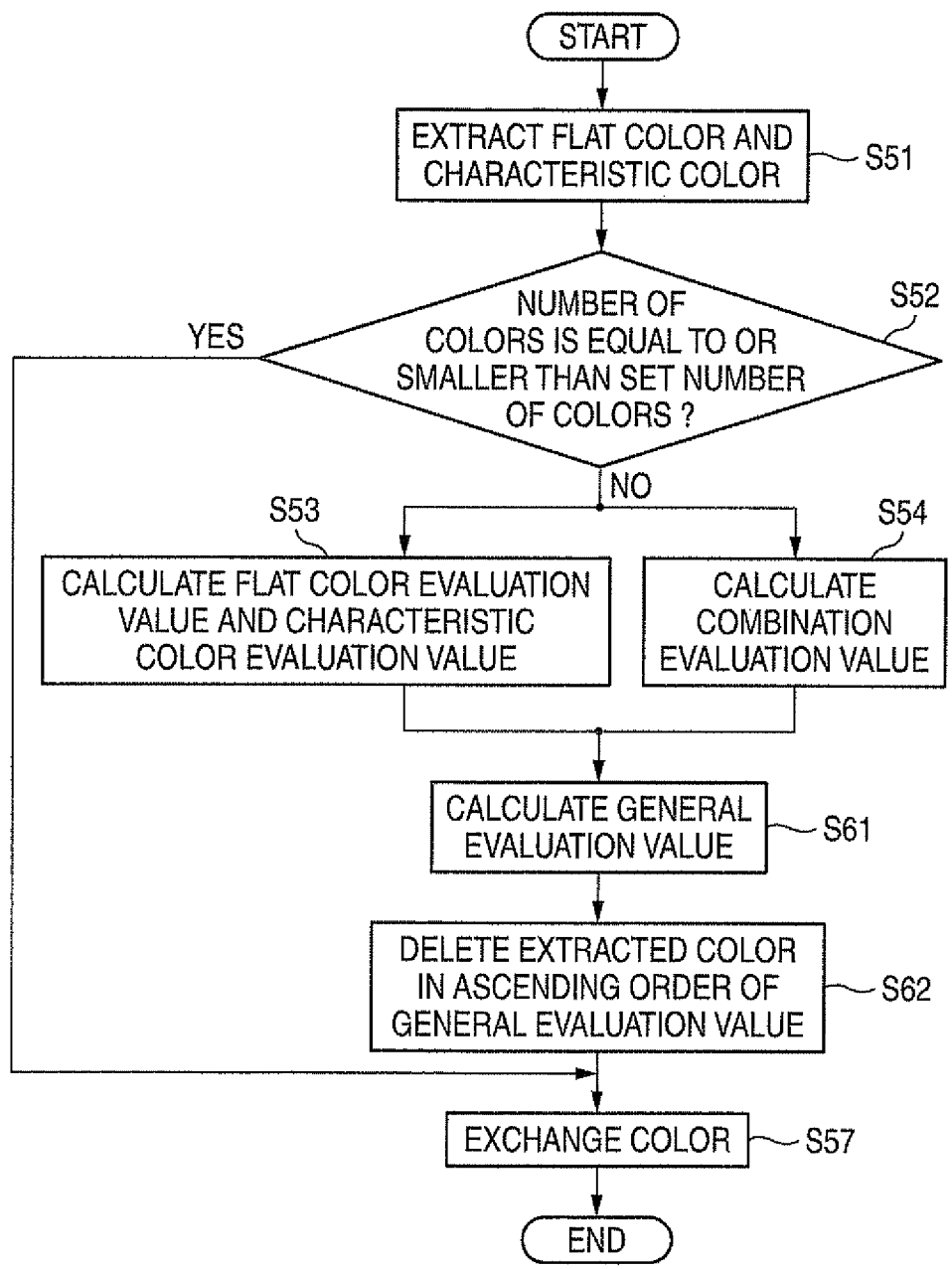
FIG. 3 is a flowchart showing a second operation example according to the first exemplary embodiment of the invention.

FIG. 3 is a flowchart showing a second operation example according to the first exemplary embodiment of the invention. There is shown a method of simply deleting an extracted color in accordance with a result of a one-time calculation for the flat color evaluation value or characteristic color evaluation value Hi and the combination evaluation value Gi. At S51, the color extracting portion 11 extracts at least one flat color and at least one characteristic color from colors used in a processing target image. In the first exemplary embodiment, a similar color is deleted in the extraction.

At S52, it is decided whether or not the number of the extracted colors is equal to or smaller than a preset number. If the number of the extracted colors exceeds the preset number, the flat color evaluation value or the characteristic color evaluation value Hi is calculated by the flat color evaluation value and characteristic color evaluation value calculating portion 12 at S53 and the combination evaluation value Gi is calculated by the combination evaluation value calculating portion 13 at S54. The flat color evaluation value Hi, the characteristic color evaluation value Hi and the combination evaluation value Gi may be calculated at the same time or in order.

At S61, furthermore, the extracted color deleting portion 14 calculates a general evaluation value based on the flat color evaluation value and the characteristic color evaluation value Hi obtained at the S53 and the combination evaluation value Gi obtained at the S54. It is preferable to calculate the general evaluation value Si in accordance with the function described in the S55 of FIG. 2. At S62, a larger number of extracted colors than the preset number are deleted in ascending order of the general evaluation value Si which is obtained. In the example, the flat color or the characteristic color may be deleted.

If it is decided that the number of the extracted colors is equal to or smaller than the preset number at the S52 and that the preset number of extracted colors are deleted at S62, the processing proceeds to S57 in which the color exchanging portion 16 exchanges a color of a processing target image into the preset number of colors or less and generates an image subjected to a color limitation processing. In the case in which there is carried out a processing for extracting the color used in the processing target image within the preset number, it is not necessary to execute the processing of the S57.

In the case in which either the flat color or the characteristic color is deleted with a priority, it is preferable to carry out different weighting operations from each other over the flat color and the characteristic color for the general evaluation value which is obtained, thereby deleting the color in ascending order of the general evaluation value Si. In this case, whether the flat color or the characteristic color is to be deleted with a priority or is to be deleted generally is preferably decided in accordance with the result of the determination made by the determining portion 15.

Figure 4:
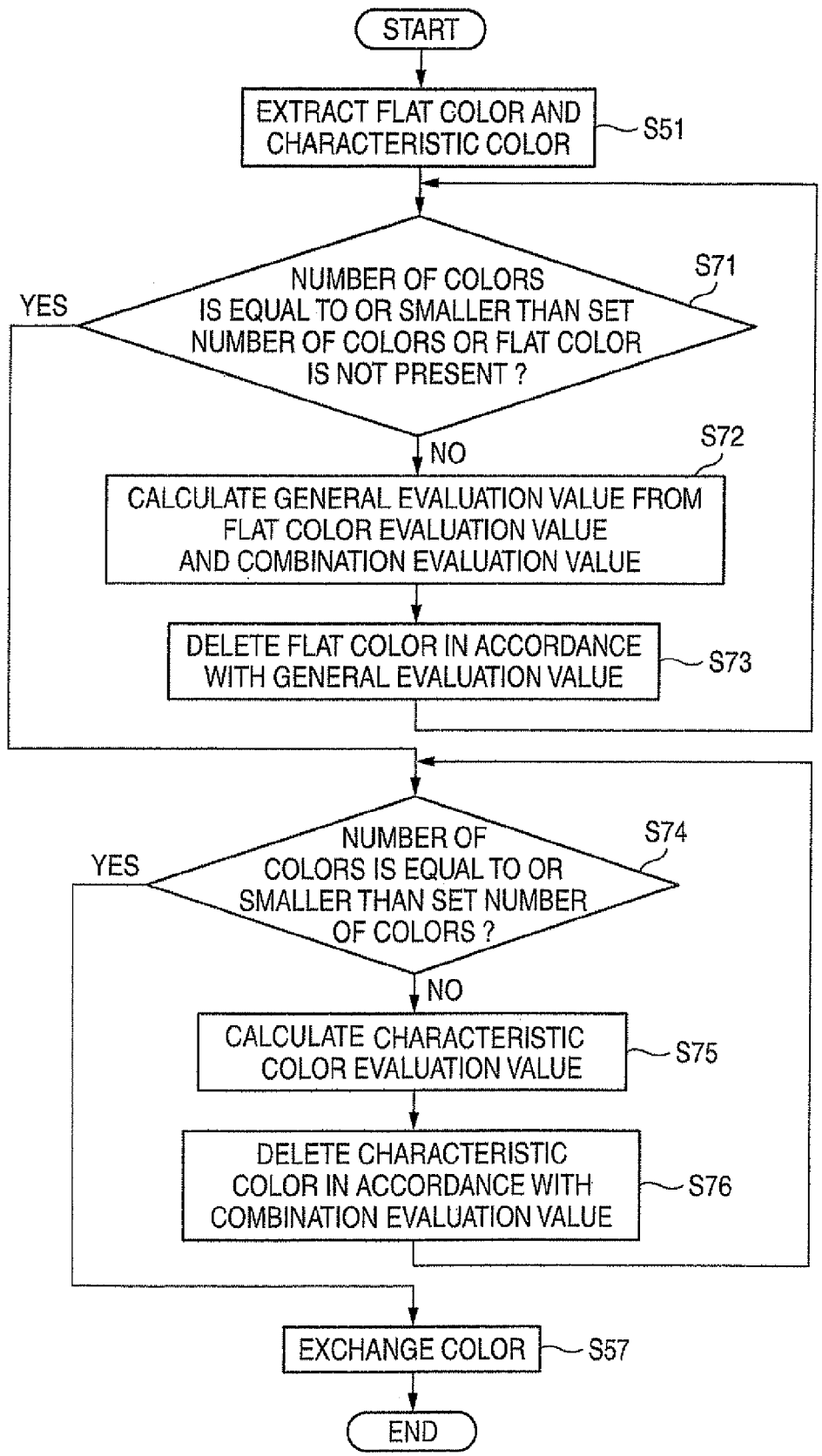
FIG. 4 is a flowchart showing a third operation example according to the first exemplary embodiment of the invention.

FIG. 4 is a flowchart showing a third operation example according to the first exemplary embodiment of the invention. There is shown another example of the case in which importance is attached to the characteristic color to be left. There is shown an example in which the flat color is first deleted, and the characteristic color is deleted when a preset number is exceeded even if the flat color is gone. At S51, the color extracting portion 11 extracts at least one flat color and at least one characteristic color from colors used in a processing target image. In the first exemplary embodiment, a similar color is deleted in the extraction.

At S71, it is decided whether or not the number of extracted colors is equal to or smaller than a preset number and the flat color is present. If the number of extracted colors exceeds the preset number and the flat color is present, the flat color evaluation value Hi is calculated by the flat color evaluation value and characteristic color evaluation value calculating portion 12 and the combination evaluation value Gi is calculated by the combination evaluation value calculating portion 13 for the respective flat colors, and furthermore, the extracted color deleting portion 14 calculates the general evaluation value Si based on the flat color evaluation value Hi and the combination evaluation value Gi at S72. It is preferable to calculate the general evaluation value Si in accordance with the function described in the S55 of FIG. 2. At S73, then, there is deleted the flat color having the minimum general evaluation value Si obtained. The processing returns to the S71 and the processings of the S72 and the S73 are repeated until the number of extracted colors is equal to or smaller than the preset number or the flat color is not present.

If it is decided that the number of extracted colors is equal to or smaller than the preset number or the flat color is not present at the S71, it is decided whether or not the number of extracted colors is equal to or smaller than the preset number at S74. If the number of extracted colors exceeds the preset number, the characteristic color evaluation value Hi is calculated by the flat color evaluation value and characteristic color evaluation value calculating portion 12 for the respective characteristic colors at S75. In this case, the flat color has already been deleted. Therefore, the combination evaluation value Gi and the general evaluation value Si are not calculated. At S76, there is deleted the characteristic color having the smallest characteristic color evaluation value Hi obtained. The processing returns to the S74 and the processings of the S75 and the S76 are repeated until the number of extracted colors is equal to or smaller than the preset number.

If the number of the colors extracted at the S51 exceeds the preset number, thus, the flat color is first deleted and an extraction for attaching importance to the characteristic color is carried out. If it is decided that the number of the extracted colors is equal to or smaller than the preset number at the S74, the processing proceeds to S57 in which the color exchanging portion 16 exchanges a color of a processing target image into the preset number of colors or less which are left and an image subjected to a color limitation processing is generated. In the case in which a processing for extracting the color used in the processing target image within the preset number is carried out, it is not necessary to execute the processing of the S57.

Figure 5:
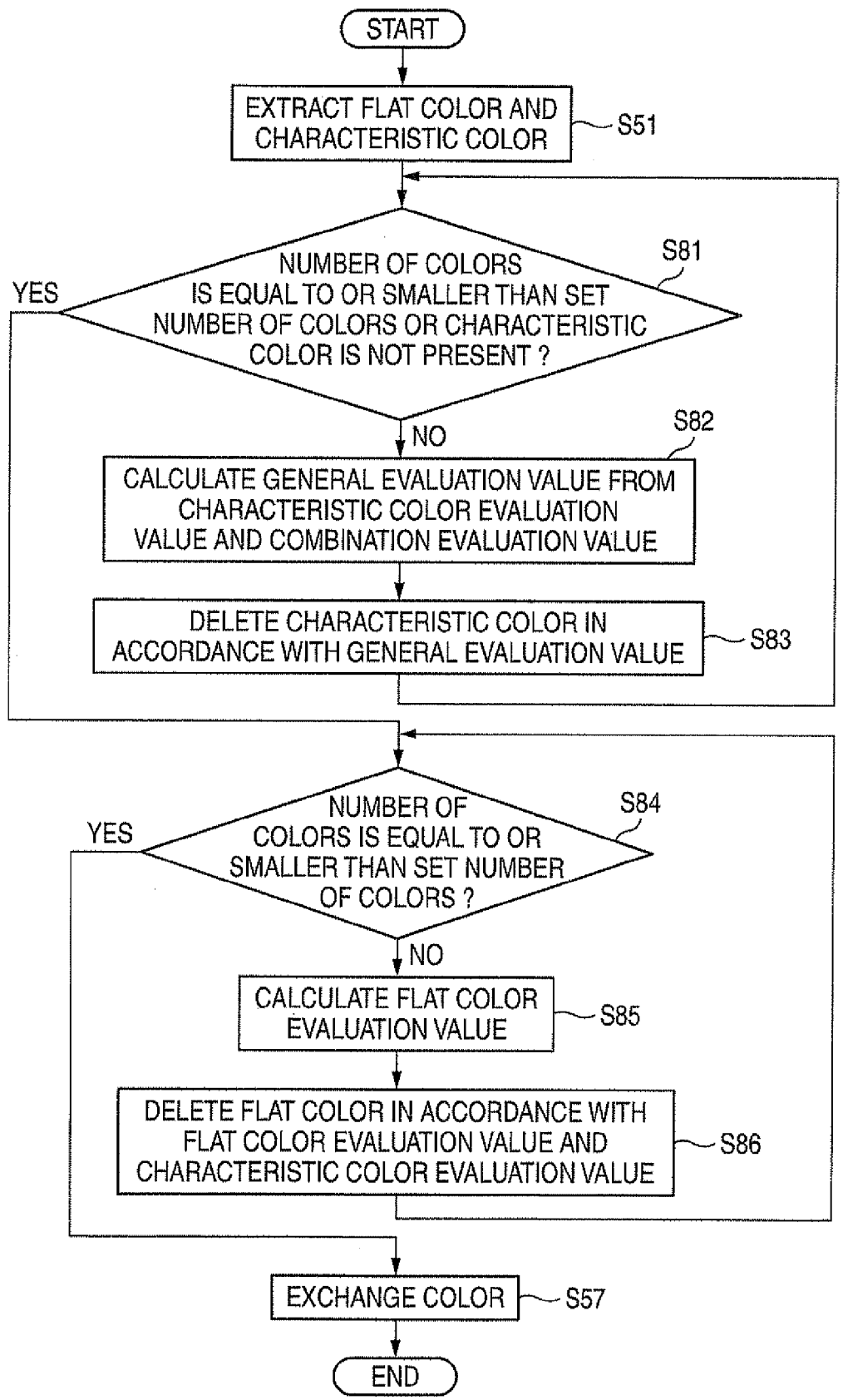
FIG. 5 is a flowchart showing a fourth operation example according to the first exemplary embodiment of the invention.

FIG. 5 is a flowchart showing a fourth operation example according to the first exemplary embodiment of the invention. There is shown another example of the case in which importance is attached to the flat color to be left. There is shown an example in which the characteristic color is first deleted, and the flat color is deleted when a preset number is exceeded even if the characteristic color is gone. At S51, the color extracting portion 11 extracts at least one flat color and at least one characteristic color from colors used in a processing target image. In the first exemplary embodiment, a similar color is deleted in the extraction.

At S81, it is decided whether or not the number of extracted colors is equal to or smaller than a preset number and the characteristic color is present. If the number of extracted colors exceeds the preset number and the characteristic color is present, the characteristic color evaluation value Hi is calculated by the flat color evaluation value and characteristic color evaluation value calculating portion 12 and the combination evaluation value Gi is calculated by the combination evaluation value calculating portion 13 for the respective characteristic colors, and furthermore, the extracted color deleting portion 14 calculates the general evaluation value Si based on the characteristic color evaluation value Hi and the combination evaluation value Gi at S82. It is preferable to calculate the general evaluation value Si in accordance with the function described in the S55 of FIG. 2. At S83, then, there is deleted the characteristic color having the minimum general evaluation value Si obtained. The processing returns to the S81 and the processings of the S82 and the S83 are repeated until the number of extracted colors is equal to or smaller than the preset number or the characteristic color is not present.

If it is decided that the number of extracted colors is equal to or smaller than the preset number or the characteristic color is not present at the S81, it is decided whether or not the number of extracted colors is equal to or smaller than the preset number at S84. If the number of extracted colors exceeds the preset number, the flat color evaluation value Hi is calculated by the flat color evaluation value and characteristic color evaluation value calculating portion 12 for the respective flat colors at S85. In this case, the characteristic color has already been deleted. Therefore, the combination evaluation value Gi and the general evaluation value Si are not calculated. At S86, there is deleted the flat color having the smallest flat color evaluation value Hi obtained. The processing returns to the S84 and the processings of the S85 and the S86 are repeated until the number of extracted colors is equal to or smaller than the preset number.

If the number of the colors extracted at the S51 exceeds the preset number, thus, the characteristic color is first deleted and an extraction for attaching importance to the flat color is carried out. If it is decided that the number of the extracted colors is equal to or smaller than the preset number at the S84, the processing proceeds to S57 in which the color exchanging portion 16 exchanges a color of a processing target image into the preset number of colors or less which are left and an image subjected to a color limitation processing is generated. In the case in which a processing for extracting the color used in the processing target image within the preset number is carried out, it is not necessary to execute the processing of the S57.

It is also possible to employ a structure in which the flat color or the characteristic color is deleted in accordance with the result of the one-time calculation for the flat color evaluation value or characteristic color evaluation value Hi, the combination evaluation value Gi and the general evaluation value Si described with reference to FIG. 3 in the processing for leaving either the flat color or the characteristic color with a priority as described with reference to FIGS. 4 and 5.

Figure 6:
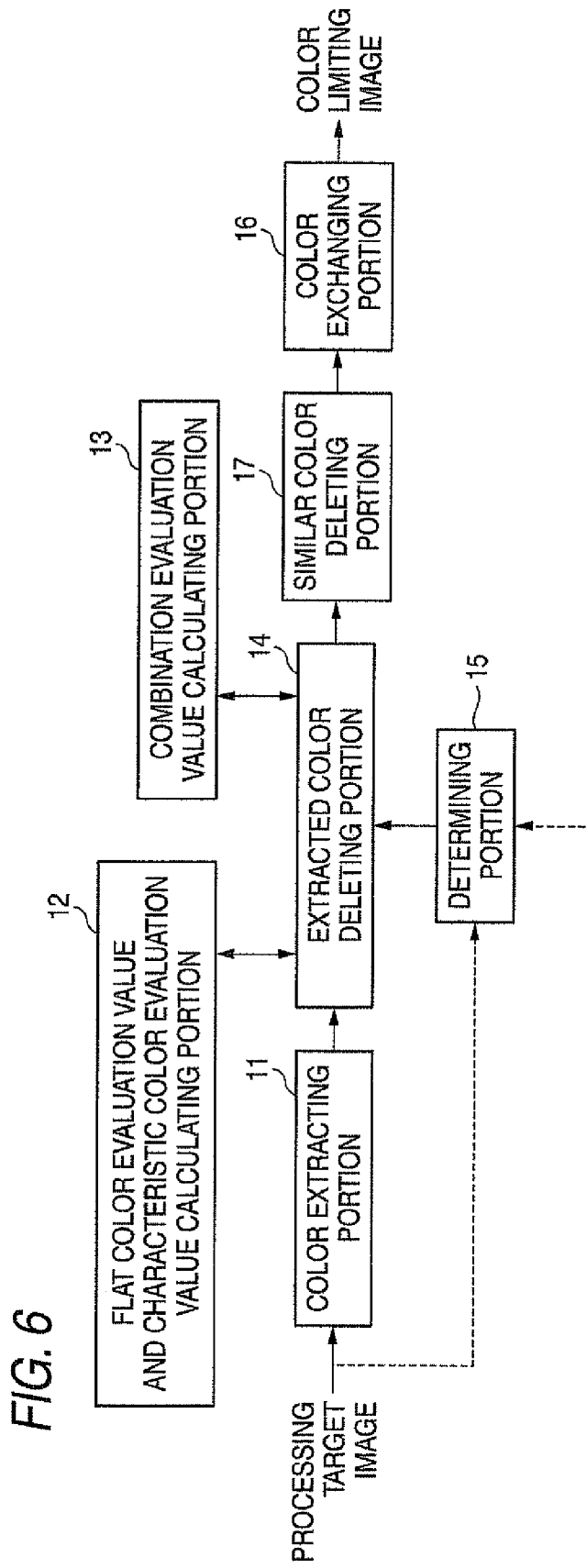
FIG. 6 is a diagram showing a structure according to a second exemplary embodiment of the invention.

FIG. 6 is a diagram showing a structure according to a second exemplary embodiment of the invention. In FIG. 2, 17 denotes a similar color deleting portion. In the second exemplary embodiment, there will be described a structure in which a deletion is not carried out in an extraction when similar colors to characteristic and flat colors are extracted but is executed by the similar color deleting portion 17 after a reduction to a preset number of colors. Different portions from the first exemplary embodiment will be mainly described.

Although a color extracting portion 11 extracts at least one flat color and at least one characteristic color from colors used in a processing target image, it does not make a determination and a deletion for a similar color in the second exemplary embodiment.

An extracted color deleting portion 14 deletes a number of colors extracted by the color extracting portion 11 which exceeds a preset number based on a flat color evaluation value and a characteristic color evaluation value calculated by a flat color evaluation value and characteristic color evaluation value calculating portion 12 and a combination evaluation value calculated by a combination evaluation value calculating portion 13. It is preferable to delete a color by the method described in the first exemplary embodiment. In the second exemplary embodiment, the deleted color is stored as a history.

In the case in which the characteristic color and the flat color are present within a preset color range in the preset number of colors obtained by deleting the colors through the extracted color deleting portion 14, the similar color deleting portion 17 deletes the characteristic color or the flat color. In addition, the colors deleted by the extracted color deleting portion 14 and stored as the history are restored corresponding to the number of the deleted colors.

A color exchanging portion 16 exchanges a color of a processing target image into a color obtained after deleting the similar color by the similar color deleting portion 17 and generates an image subjected to a color limitation processing. It is also possible to employ such a structure as to output a preset number of colors or less which are obtained through the processings before the similar color deleting portion 17 without providing the color exchanging portion 16.

An operation according to the second exemplary embodiment is different from the description of each operation example according to the first exemplary embodiment in that the color extracting portion 11 does not carry out a processing for a similar color but the similar color deleting portion 17 executes a processing for a similar color before the color exchange processing of the color exchanging portion 16 or an output of a preset number of colors.

Figure 7:
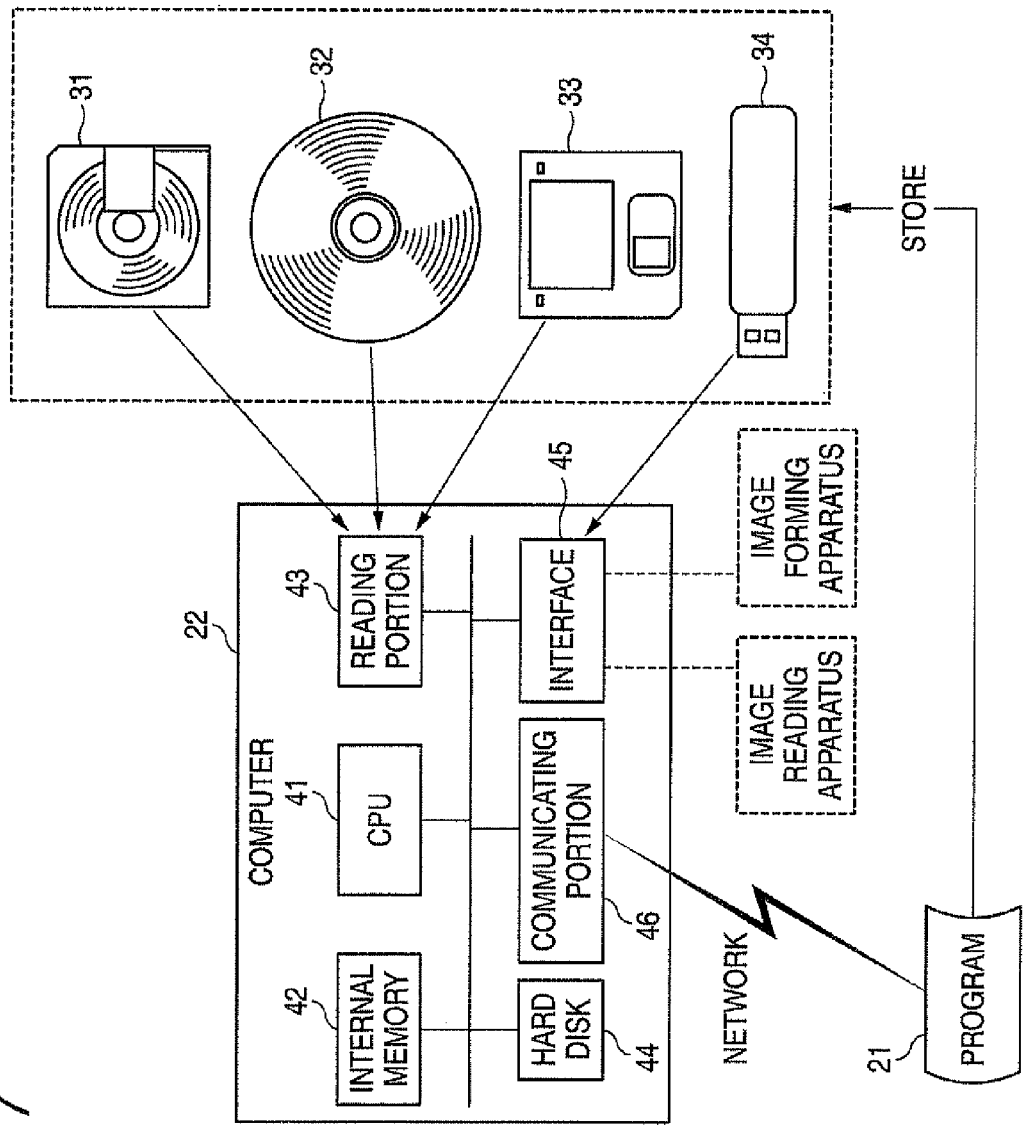
FIG. 7 is an explanatory diagram showing an example of a computer program, a storage medium storing the computer program and a computer in the case in which a function described in each of the exemplary embodiments according to the invention is implemented by the computer program.

FIG. 7 is an explanatory diagram showing an example of a computer program, a storage medium storing the computer program and a computer in the case in which the function described in each of the exemplary embodiments according to the invention is implemented by the computer program. In FIG. 7, 21 denotes a program, 22 denotes a computer, 31 denotes a magneto-optical disc, 32 denotes an optical disc, 33 denotes a magnetic disc, 34 denotes a memory, 41 denotes a CPU, 42 denotes an internal memory, 43 denotes a reading portion, 44 denotes a hard disk, 45 denotes an interface, and 46 denotes a communicating portion.

The function of each portion described in each of the exemplary embodiments according to the invention may be wholly or partially implemented by the program 21 which may be executed by the computer. In that case, it is preferable that the program 21 and data to be used by the program 21 should be stored in a computer readable storage medium. The storage medium serves to cause a changing state of an energy such as a magnetism, a light or an electricity corresponding to contents described in the program for the reading portion 43 provided in hardware resources of the computer and to transmit, to the reading portion 43, the contents described in the program in a signal format corresponding thereto. For example, the storage medium includes the magneto-optical disc 31, the optical disc 32 (containing a CD and a DVD), the magnetic disc 33, and the memory 34 (containing an IC card and a memory card). As a matter of course, the storage medium is not restricted to a portable type.

The program 21 is stored in the storage media (computer readable medium) and the storage media are attached to the reading portion 43 or the interface 45 in the computer 22 to read the program 21 from the computer, to store the program 21 in the internal memory 42 or the hard disk 44 and to execute the program 21 through the CPU 41, for example, so that the functions described in the respective exemplary embodiments according to the invention are implemented wholly or partially. Alternatively, it is also possible to implement the functions by transferring the program 21 to the computer 22 through a communication path, receiving the program 21 through the communicating portion 46 in the computer 22 and storing the program 21 in the internal memory 42 or the hard disk 44, and executing the program 21 through the CPU 41.

The computer 22 may be further connected to various devices through the interface 45. For example, it is also possible to connect display means for displaying information or receiving means for receiving information from a user. Moreover, it is also possible to employ a structure in which an image forming apparatus to be an output apparatus is connected through the interface 45 and an image subjected to a color limitation is formed by the image forming apparatus, for example. Alternatively, it is also possible to employ a structure in which an image reading apparatus is connected through the interface 45 and an image read by the image reading apparatus is set to be a processing target image and a color limitation processing is thus carried out to reduce a data volume, and the data are stored in the hard disk 44 or are transmitted to an outside through the communicating portion 46. Alternatively, it is also possible to employ a structure in which the image reading apparatus and the image forming apparatus are connected to the interface 45 and a color limitation processing is carried out over an image read by the image reading apparatus, and an image is thus formed by the image forming apparatus.

As a matter of course, the apparatus may also be constituted by hardware partially or wholly. Alternatively, it is also possible to constitute a program including the functions described in the respective exemplary embodiments according to the invention wholly or partially together with the other structures. For example, it is also possible to constitute a single program together with a control program in an apparatus including the image reading apparatus or the image forming apparatus, for example, a copying machine or a single program together with a control program in the apparatus including the image forming apparatus such as a printer. As a matter of course, it is also possible to carry out an integration with a program in the other uses in case of an application to the uses.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

What is claimed is:

1. An image processing apparatus comprising:
a processor; and
a memory containing instructions adapted to cause the processor to act as:
a color extracting section that extracts colors contained in processing image data, each of the colors being extracted as a flat color or a characteristic color where the extracted flat colors represent colors used in a large number of pixels in the processing image data and the extracted characteristic colors represent colors characteristic in the processing image data;
a first evaluation value calculating section that calculates a flat color evaluation value with respect to a combination of colors extracted as the flat colors based on a color difference therebetween, and that calculates a characteristic color evaluation value with respect to a combination of colors extracted as the characteristic colors based on a color difference therebetween;
a second evaluation value calculating section that calculates a combination evaluation value with respect to combinations of colors extracted as the characteristic colors and colors extracted as the flat colors based on a color difference therebetween; and
a deleting section that reduces a number of colors to a preset number by deleting at least one color extracted by the color extracting section in accordance with the characteristic color evaluation value, flat color evaluation value and the combination evaluation value.

2. The image processing apparatus according to claim 1, wherein the deleting section calculates a general evaluation value based on the characteristic color evaluation value, the flat color evaluation value and the combination evaluation value, and reduces the number of colors to the preset number by deleting a color extracted by the color extracting section based on the general evaluation value.

3. The image processing apparatus according to claim 1, wherein the deleting section compares the flat color evaluation value with a preset threshold and calculates a general evaluation value,
where, in a case where a flat color having an evaluation value that is equal to or smaller than the threshold is present, the general evaluation value is calculated based on the flat color evaluation value and the combination evaluation value, and the deleting section deletes a color extracted as the flat color in accordance with the general evaluation value; and, in a case where the flat color having an evaluation value which is equal to or smaller than the threshold is not present, the general evaluation value is calculated based on the characteristic color evaluation value, the flat color evaluation value and the combination evaluation value, and the deleting section deletes a color extracted by the color extracting section in accordance with the general evaluation value.

4. The image processing apparatus according to claim 1, wherein the deleting section compares the characteristic color evaluation value with a preset threshold and calculates a general evaluation value, where, in a case where a characteristic color having an evaluation value that is equal to or smaller than the threshold is present, the general evaluation value is calculated based on the characteristic color evaluation value and the combination evaluation value, and the deleting section deletes a color extracted as the characteristic color in accordance with the general evaluation value; and, in a case where the characteristic color having an evaluation value which is equal to or smaller than the threshold is not present, the general evaluation value is calculated based on the flat color evaluation value, the characteristic color evaluation value and the combination evaluation value, and the deleting section deletes a color extracted by the color extracting section in accordance with the general evaluation value.

5. The image processing apparatus according to claim 1, wherein, in a case where a first color that is contained in the processing image data and extracted as the characteristic color and a second color that is contained in the processing image data and extracted as the flat color are present within a preset range, the color extracting section deletes either the first color or the second color.

6. The image processing apparatus according to claim 2, wherein, in a case where a first color that is contained in the processing image data and extracted as the characteristic color and a second color that is contained in the processing image data and extracted as the flat color are present within a preset range, the color extracting section deletes either the first color or the second color.

7. The image processing apparatus according to claim 3, wherein, in a case where a first color that is contained in the processing image data and extracted as the characteristic color and a second color that is contained in the processing image data and extracted as the flat color are present within a preset range, the color extracting section deletes either the first color or the second color.

8. The image processing apparatus according to claim 4, wherein, in a case where a first color that is contained in the processing image data and extracted as the characteristic color and a second color that is contained in the processing image data and extracted as the flat color are present within a preset range, the color extracting section deletes either the first color or the second color.

9. The image processing apparatus according to claim 1, further comprising:
a similar color deleting section,
wherein, in a case where a first color that is contained in the processing image data and extracted as the characteristic color and a second color that is contained in the processing image data and extracted as the flat color are present within a preset range after the deleting section reduces the number of colors to the preset number, the similar color deleting section deletes either the first color or the second color and restores a color deleted by the deleting section corresponding to a number of colors deleted by the similar color deleting section.

10. The image processing apparatus according to claim 2, further comprising:
a similar color deleting section,
wherein, in a case where a first color that is contained in the processing image data and extracted as the characteristic color and a second color that is contained in the processing image data and extracted as the flat color are present within a preset range after the deleting section reduces the number of colors to the preset number, the similar color deleting section deletes either the first color or the second color and restores a color deleted by the deleting section corresponding to a number of colors deleted by the similar color deleting section.

11. The image processing apparatus according to claim 3, further comprising:
a similar color deleting section,
wherein, in a case where a first color that is contained in the processing image data and extracted as the characteristic color and a second color that is contained in the processing image data and extracted as the flat color are present within a preset range after the deleting section reduces the number of colors to the preset number, the similar color deleting section deletes either the first color or the second color and restores a color deleted by the deleting section corresponding to a number of colors deleted by the similar color deleting section.

12. The image processing apparatus according to claim 4, further comprising:
a similar color deleting section,
wherein, in a case where a first color that is contained in the processing image data and extracted as the characteristic color and a second color that is contained in the processing image data and extracted as the flat color are present within a preset range after the deleting section reduces the number of colors to the preset number, the similar color deleting section deletes either the first color or the second color and restores a color deleted by the deleting section corresponding to a number of colors deleted by the similar color deleting section.

13. The image processing apparatus according to claim 1, further comprising:
determining section that determines whether either colors extracted as the characteristic color or the flat color is to be left with a priority,
wherein the deleting section deletes a color extracted by the color extracting section in accordance with a determination made by the determining section.

14. The image processing apparatus according to claim 13, wherein the determining section determines in accordance with a result of an analysis of the processing image data.

15. The image processing apparatus according to claim 1, further comprising:
color exchanging section that exchanges a color included in the processing image data into a color left undeleted and contained within the preset number of colors.

16. A non-transitory computer readable medium storing a program causing a computer to execute a process for image processing, the process comprising:
extracting colors contained in processing image data, each of the colors being extracted as a flat color or a characteristic color where the extracted flat colors represent colors used in a large number of pixels in the processing image data and the extracted characteristic colors represent colors characteristic in the processing image data;

calculating a fiat color evaluation value with respect to a combination of colors extracted as the fiat colors based on a color difference therebetween;

calculating a characteristic color evaluation value with respect to a combination of colors extracted as the characteristic colors based on a color difference therebetween;

calculating a combination evaluation value with respect to combinations of colors extracted as the characteristic colors and colors extracted as the fiat colors based on a color difference therebetween; and reducing a number of colors to a preset number by deleting at least one color extracted in accordance with the characteristic color evaluation value, fiat color evaluation value and the combination evaluation value.

17. An image processing method comprising:

extracting colors contained in processing image data, each of the colors being extracted as a flat color or a characteristic color where the extracted flat colors represent colors used in a large number of pixels in the processing image data and the extracted characteristic colors represent colors characteristic in the processing image data;

calculating a fiat color evaluation value with respect to a combination of colors extracted as the fiat colors based on a color difference therebetween;

calculating a characteristic color evaluation value with respect to a combination of colors extracted as the characteristic colors based on a color difference therebetween;

calculating a combination evaluation value with respect to combinations of colors extracted as the characteristic color and colors extracted as the fiat colors based on a color difference therebetween; and reducing a number of colors to a preset number by deleting at least one color extracted in accordance with the characteristic color evaluation value, fiat color evaluation value and the combination evaluation value.

\* \* \* \* \*